(12) United States Patent
Liu et al.

(10) Patent No.: US 12,566,766 B2
(45) Date of Patent: Mar. 3, 2026

(54) USING ARTIFICIAL INTELLIGENCE FOR TAGGING KEY INGREDIENTS TO PROVIDE RECIPE RECOMMENDATIONS

(71) Applicant: Maplebear Inc., San Francisco, CA (US)

(72) Inventors: Yile Liu, Sunnyvale, CA (US); Jatin Jain, Sammamish, WA (US); Prithvishankar Srinivasan, Seattle, WA (US); Riddhima Sejpal, Dublin, CA (US); Jesse Bentert, New York, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/522,046

(22) Filed: Nov. 28, 2023

(65) Prior Publication Data

US 2025/0173345 A1     May 29, 2025

(51) Int. Cl.
G06F 16/2457 (2019.01)
G06F 16/248 (2019.01)
G06N 3/0455 (2023.01)
G06Q 30/0601 (2023.01)

(52) U.S. Cl.
CPC ...... G06F 16/24578 (2019.01); G06F 16/248 (2019.01); G06N 3/0455 (2023.01); G06Q 30/0613 (2013.01)

(58) Field of Classification Search
CPC ............ G06F 16/24578; G06F 16/248; G06N 3/0455; G06Q 30/0613
See application file for complete search history.

(56) References Cited

U.S. PATENT DOCUMENTS

| | | | |
|---|---|---|---|
| 2017/0052987 A1* | 2/2017 | Allen | G06F 16/36 |
| 2021/0192596 A1* | 6/2021 | Archak | G06F 16/24578 |
| 2021/0406545 A1* | 12/2021 | Dulski | G06V 20/20 |
| 2022/0215061 A1* | 7/2022 | Nigul | G06N 20/00 |
| 2023/0405834 A1* | 12/2023 | Pashut | A47B 77/08 |

* cited by examiner

*Primary Examiner* — Tony Wu
(74) *Attorney, Agent, or Firm* — Fenwick & West LLP

(57) ABSTRACT

An online concierge system may update, responsive to a request from a user client device, a shopping list with a food item. The system may query a recipe database based in part on the food item to obtain one or more recipes that use the food item as a key ingredient, where the key ingredients in a recipe are tagged in the recipe database. The key ingredients for each of the corresponding recipes are identified using a machine learned model. The system ranks the one or more recipes based on one or more ranking criteria, such as a number of key ingredients of the recipe that are present in the shopping list. The system may provide the one or more ranked recipes to the user client device for presentation.

20 Claims, 7 Drawing Sheets

490

Recipe
Carousel
430

Recipe
460A

Recipe
460B

Update, responsive to a request from a user client device of a user, a shopping cart
510

Query a recipe database based in part on food items in the updated shopping list to obtain one or more recipes that use the food items as key ingredients
520

Rank the one or more recipes based on one or more ranking criteria
530

Provide the one or more ranked recipes to the client device
540

USING ARTIFICIAL INTELLIGENCE FOR TAGGING KEY INGREDIENTS TO PROVIDE RECIPE RECOMMENDATIONS

BACKGROUND

Current approaches for online shopping platforms often provide a shopping list feature that allows users to add items for purchase. However, these platforms typically do not offer a comprehensive solution for assisting users in finding recipes based on the items in their shopping list. Moreover, users may have difficulty deciding what to cook or may not be aware of recipes that utilize the items they have selected for purchase. Given the very large number of recipes that may be relevant to any list of partial ingredients, there are opportunities to address the technical challenge of programmatically finding recipes that match items that users have placed in their carts.

SUMMARY

In accordance with one or more aspects of the disclosure, recipes recommendations are generated based on shopping list contents and key ingredient mappings derived using artificial intelligence. A recipe database maps food items to corresponding recipes that use the food items as key ingredients. The key ingredients for each of the corresponding recipes are identified using one or more machine learned models of an artificial intelligence system. As used herein, a "key ingredient" for a recipe is an ingredient that represents the nature of the recipe, is relatively more difficult to substitute than other ingredients, or is otherwise relatively more important for the recipe, as determined by a trained model in accordance with one or more embodiments described herein.

In one or more embodiments, a recipe database stores information for a plurality of recipes, where each entry in the database for a recipe may contain a list of ingredients, a description of a process for making the recipe, and other metadata about the recipes (e.g., title, author, etc.). For at least a set of recipes in the recipe database, each recipe is pre-processed to identify and tag one or more key ingredients from the list of ingredients of the recipe. To identify the key ingredients for a particular recipe, an online system may generate one or more prompts to provide to one or more machine learned models, which may include a large language model (LLM). The prompt may be configured to instruct the one or more machine learned models to identify, for each of the plurality of recipes, the key ingredients from the full list of ingredients of that recipe. The online system may then provide the one or more prompts to the artificial intelligence system to obtain at least one key ingredient for each of the plurality of recipes. Once the key ingredients are identified, the online system updates the recipe database to tag the identified key ingredients for each of the plurality of recipes.

During a session with the online system, a user client device associated with a user may be configured to present a storefront that includes a plurality of food items for sale. Responsive to a request from the user, the user client device may request the online system update a shopping list associated with the user (e.g., to add a food item to the shopping list, to remove a food item from the shopping list, etc.).

Responsive to the request, the online system may update the shopping list (e.g., add a food item to the shopping list, remove a food item from the shopping list). The online system may query a recipe database based in part on content (e.g., food items) of the updated shopping list to obtain one or more recipes. The online system may rank the one or more recipes based on one or more ranking criteria (e.g., a recipe based on a number of key ingredients of the recipe that are present in the shopping list). The one or more ranked recipes may be provided to the user client device. The user client device may present the one or more ranked recipes in ranked order. For example, the user client device may present the recipes on a recipe carousel. For convenience, in one or more embodiments, the user can add the remaining items from a recipe by interacting with one or the recommended recipes in the user interface, thereby more efficiently interacting with the online system to fulfill an order with fewer user input steps.

DETAILED DESCRIPTION

Figure 1:
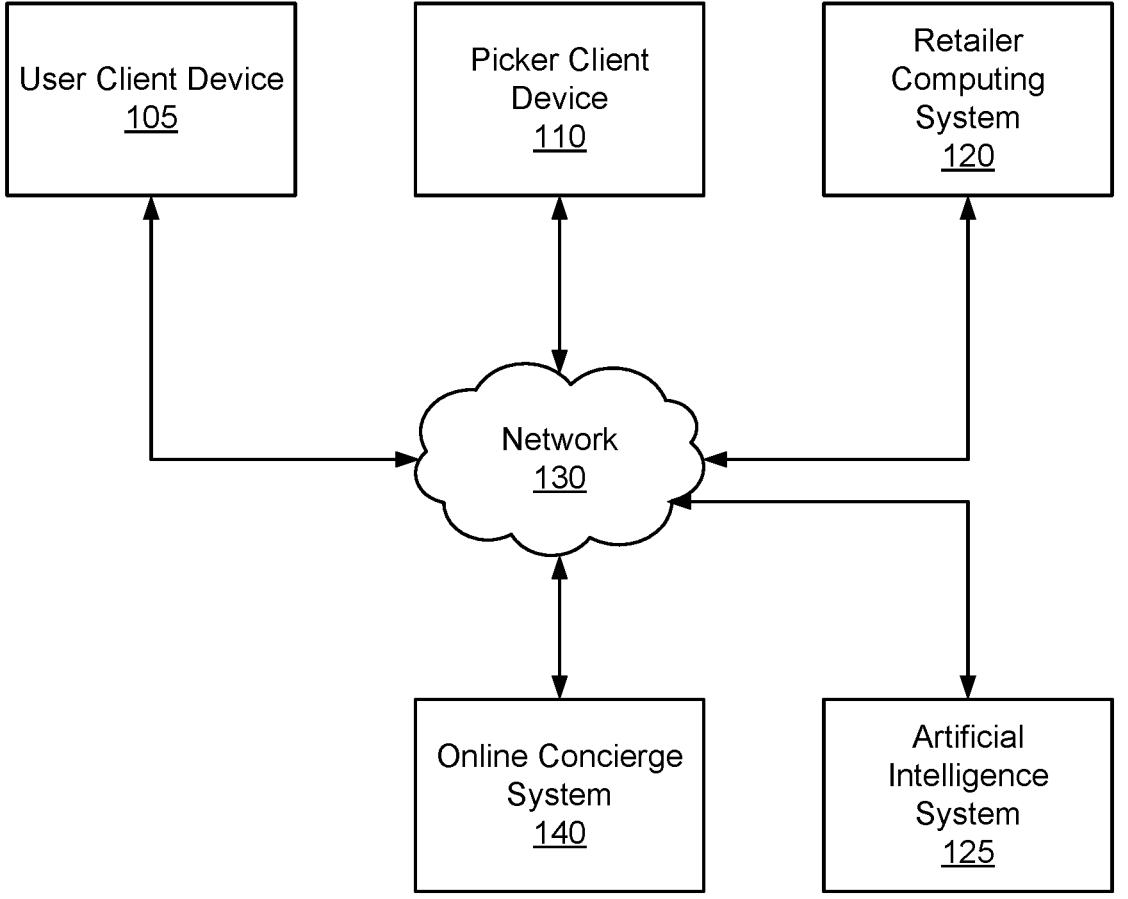
FIG. 1 illustrates an example system environment for an online system, in accordance with one or more embodiments.

FIG. 1 illustrates an example system environment for an online concierge system 140, in accordance with one or more embodiments. The system environment illustrated in FIG. 1 includes a user client device 105, a picker client device 110, a retailer computing system 120, an artificial intelligence (AI) system 125, a network 130, and an online concierge system 140. Alternative embodiments may include more, fewer, or different components from those illustrated in FIG. 1, and the functionality of each component may be divided between the components differently from the description below. For example, some or all of the functionality of the AI system 125 may be performed by the online concierge system 140. Additionally, each component may perform their respective functionalities in response to a request from a human, or automatically without human intervention.

As used herein, users, pickers, and retailers may be generically referred to as "users" of the online concierge system 140. Additionally, while one user client device 105, picker client device 110, and retailer computing system 120 are illustrated in FIG. 1, any number of users, pickers, and retailers may interact with the online concierge system 140. As such, there may be more than one user client device 105, picker client device 110, or retailer computing system 120.

The user client device 105 is a client device through which a user may interact with the picker client device 110, the retailer computing system 120, or the online concierge system 140. The user client device 105 can be a personal or mobile computing device, such as a smartphone, a tablet, a laptop computer, or desktop computer. In some embodiments, the user client device 105 executes a client application that uses an application programming interface (API) to communicate with the online concierge system 140.

A user uses the user client device 105 to place an order with the online concierge system 140. An order specifies a set of items to be delivered to the user. An "item," as used herein, means a good or product that can be provided to the user through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

A "food item" is an item that is a nourishing substance that may be eaten and/or drunk. Recipes are a set of directions for preparing one or more ingredients to obtain a preparation of a nourishing substance. A recipe has a full list of ingredients, and the full list of ingredients includes at least one key ingredient. A key ingredient of a recipe is a main ingredient that has significant influence in, e.g., the flavor, texture, taste, aroma, appeal, etc., of the preparation. For example, potatoes are a key ingredient for potato salad, but parsley—while an ingredient—is not a key ingredient. Depending on the recipe there may be multiple key ingredients for the recipe. Moreover, being a key ingredient is highly dependent on the type of recipe. For example, potatoes may not be a key ingredient for pot roast, but would be a key ingredient for potato salad.

The user client device 105 presents an ordering interface to the user. The ordering interface is a user interface that the user can use to place an order with the online concierge system 140. The ordering interface may be part of a client application operating on the user client device 105. The ordering interface may present one or more storefronts for different retailer computing systems 120 and/or the online concierge system 140. A storefront may be presented as part of a page that includes an item area that lists a plurality of items that are for sale. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The ordering interface also includes a recipe carousel. The recipe carousel may share the page with the item area. The recipe carousel includes one or more recipes provided by the online concierge system 140 based on the ingredients in the shopping list. Some examples of the ordering interface are shown and described below with regard to FIGS. 4A-C.

The user client device 105 may receive additional content from the online concierge system 140 to present to a user. For example, the user client device 105 may receive coupons, recipes, or item suggestions. The user client device 105 may present the received additional content to the user as the user uses the user client device 105 to place an order (e.g., as part of the ordering interface).

Additionally, the user client device 105 includes a communication interface that allows the user to communicate with a picker that is servicing the user's order. This communication interface allows the user to input a text-based message to transmit to the picker client device 110 via the network 130. The picker client device 110 receives the message from the user client device 105 and presents the message to the picker. The picker client device 110 also includes a communication interface that allows the picker to communicate with the user. The picker client device 110 transmits a message provided by the picker to the user client device 105 via the network 130. In some embodiments, messages sent between the user client device 105 and the picker client device 110 are transmitted through the online concierge system 140. In addition to text messages, the communication interfaces of the user client device 105 and the picker client device 110 may allow the user and the picker to communicate through audio or video communications, such as a phone call, a voice-over-IP call, or a video call.

The picker client device 110 is a client device through which a picker may interact with the user client device 105, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the user client device 105 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140.

Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 105 for display to the user such that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The AI system 125 is configured to apply prompts to one or more machine learned models to generate responses to the prompts. The AI system 125 includes one or more machine learned models. The one or more machine learned models may be generative machine learned models. The AI system 125 may receive prompts from the online concierge system 140 to identify key ingredients for various recipes, and provide a listing of key ingredients for each of the various recipes. In some embodiments, AI system 125 may be a third-party server that is independent and separate from the online concierge system 140.

In one or more embodiments, the one or more machine learned models include one or more large language models (LLMs) that are trained on a large corpus of training data to generate outputs for the natural language processing (NLP) tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the AI system 125. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The user client device 105, the picker client device 110, the retailer computing system 120, the AI system 125, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 105 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provides portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 105 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

Responsive to a request from the user client device 105, the online concierge system 140 may update a shopping list (e.g., add a food item to the shopping list, remove a food item from the shopping list, etc.) associated with the user. The online concierge system 140 may query a recipe database (e.g., maps food items to corresponding recipes that use the food items as key ingredients) based in part on the food item to obtain one or more recipes based on food items that are part of the shopping list. The online concierge system 140 may query a recipe database based in part on the update to obtain one or more recipes. The online concierge system may rank the one or more recipes based on one or more ranking criteria (e.g., a recipe based on a number of key ingredients of the recipe that are present in the shopping list). The one or more ranked recipes may be provided to the user client device 105 (e.g., for presentation in the recipe carousel). The online concierge system 140 is described in further detail below with regards to FIG. 2.

Figure 2:
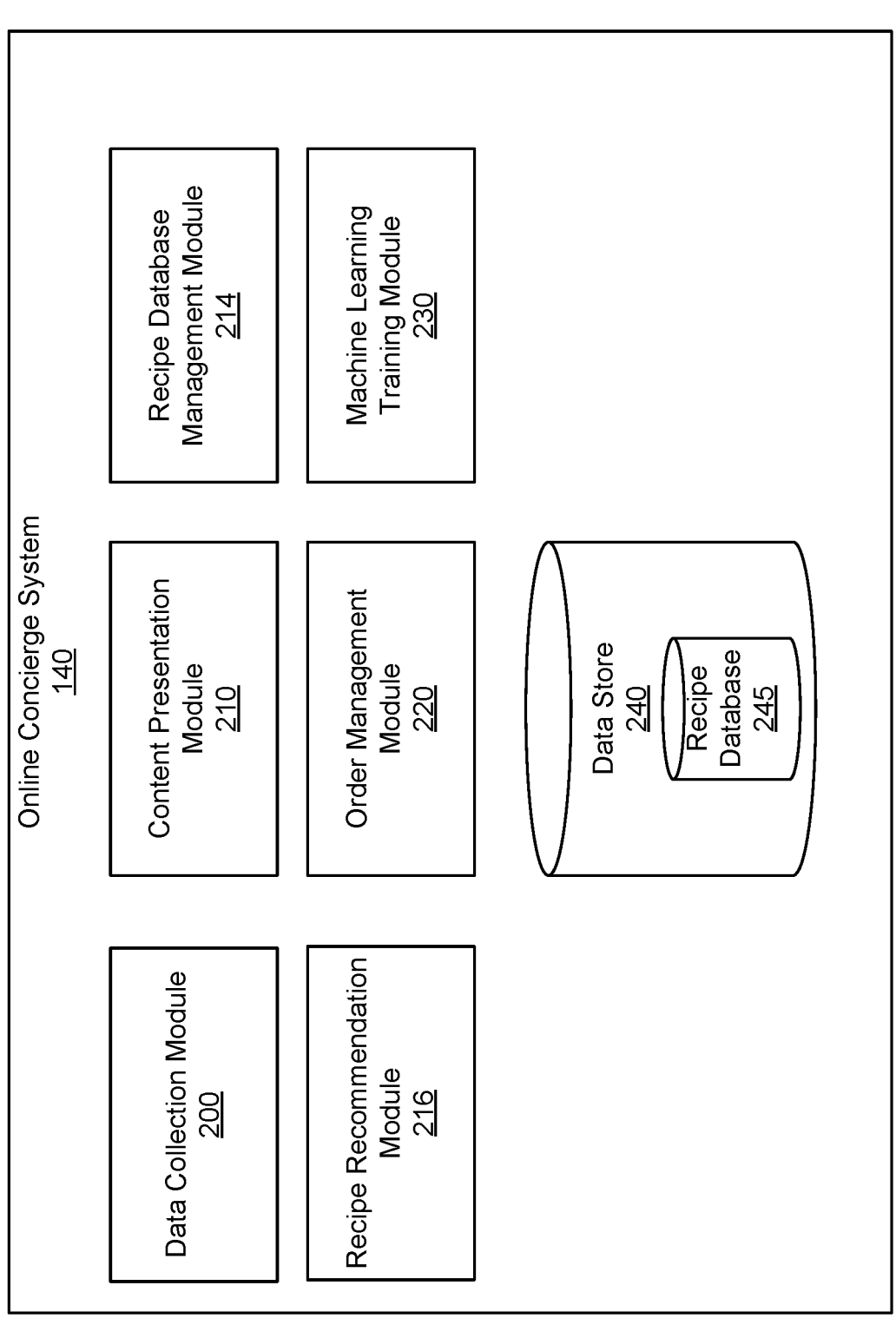
FIG. 2 illustrates an example system architecture for an online system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, a recipe database management module 214, a recipe recommendation module 216, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default retailer/retailer location, payment instrument, delivery location, or delivery timeframe. The data collection module 200 may collect the user data from sensors on the user client device 105 or based on the user's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 105.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a user rating for the picker, which retailers the picker has collected items at, or the picker's previous shopping history. Additionally, the picker data may include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order.

The content presentation module 210 selects content for presentation to a user. For example, the content presentation module 210 selects which items to present to a user while the user is placing an order. The content presentation module 210 generates and transmits the ordering interface for the user to order items. The content presentation module 210 populates the ordering interface (e.g., in the item area) with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine learning models and may be stored in the data store 240.

In some embodiments, the content presentation module 210 scores items based on a search query received from the user client device 105. A search query is text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a user based on whether the predicted availability of the item exceeds a threshold.

The recipe database management module 214 manages a recipe database 245 that maps food items to corresponding recipes that use the food items as key ingredients. The recipe database management module 214 updates the recipe database 245 with new mappings of key ingredients that are food items to corresponding recipes. The recipe database management module 214 may, e.g., update the recipe database 245 periodically (e.g., hourly, daily, weekly, etc.) or in accordance with some other schedule.

To update the recipe database 245, the recipe database management module 214 selects a plurality of recipes. Each of the plurality of recipes has an associated full list of ingredients.

The recipe database management module 214 generates one or more prompts to provide to the AI system 125. In some embodiments, generation of a prompt includes updating a previously generated prompt with new information. The one or more prompts may be configured to instruct the machine learned models of the AI system 125 to identify, for each of the plurality of recipes, key ingredients from the full list of ingredients of that recipe. In one example, the prompt instructs the AI system 125 that a key ingredient of a recipe is a main ingredient that has significant influence in, e.g., the flavor, texture, taste, aroma, appeal, etc., of the preparation. The prompt may allow for multiple key ingredients in a recipe. In some embodiments, the prompt may specify that any type of protein in a recipe is a key ingredient. The prompt may also, e.g., instruct the AI system 125 to only return key ingredients. The recipe database management module 214 may provide the one or more prompts to the AI system 125 to obtain at least one key ingredient for each of the plurality of recipes. For example, the plurality of recipes may include baked salmon whose full list of ingredients include salmon, lemon, and seasoning; and tomato bisque whose full list of ingredients includes tomatoes, cream, onions, and basil. The AI system 125 may identify that salmon is a key ingredient for the baked salmon recipe, and tomatoes and cream are key ingredients for the tomato bisque recipe.

The recipe database management module 214 receives from the AI system 125 for each of the plurality of recipes key a respective set of one or more key ingredients. The recipe database management module 214 associates the identified key ingredients to corresponding to food items that are for sale using the online concierge system 140. Note a key ingredient may correspond to multiple food items. For example, a key ingredient of "chicken" may map to food items like (e.g., 1 lb. of chicken breast, 1 lb. of chicken thighs, etc.). In some embodiments, for each recipe of the plurality of recipes, where all of the key ingredients of the recipe have corresponding food items, the recipe database management module 214 updates the recipe database 245 with a mapping of the food items to the recipe. The mapping may be, e.g., between item data (e.g., identifier, SKU, etc.) of a food item to one or more corresponding recipes where the food item is a key ingredient. In some embodiments, for a given recipe, where some but not all of the key ingredients of the recipe have corresponding food items, the recipe database management module 214 updates the recipe database 245 with a mapping of the food items to the recipe and flags the recipe. In some embodiments, a recipe that is flagged in the recipe database 245 may not be provided as a recommended recipe in a recipe carousel on the user client device 105. In other embodiments, the recipe may be provided as a recommended recipe on the recipe carousel on the user client device 105, but with an alert notifying the user of a key ingredient that is missing. And if at some point the missing key ingredients are associated with a food item (e.g., retailer begins selling food items that correspond to the missing key ingredients), the recipe database management module 214 may clear the flag associated with the recipe in the recipe database 245.

The recipe recommendation module 216 generates recipe recommendations for a user based in part on contents (e.g., food items) of the shopping list for that user. Responsive to an update (e.g., addition of a food item, subtraction of a food item) to the shopping list of the user, the recipe recommendation module 216 may generate a query for recipes using item data (e.g., SKU, item identifier, etc.) associated with food items in the shopping list as parameters for the query. The recipe recommendation module 216 may provide the query to the recipe database 245 to obtain recipes that use at least one food item in the shopping list.

The recipe recommendation module 216 may rank the one or more recipes based on one or more ranking criteria. Ranking criteria is one or more criterion that are used to rank recipes. Ranking criteria may include, e.g., a number of key ingredients of the recipe that are present in the shopping list, availability of key ingredients of the recipe from the storefront for purchase that are not present in the shopping list, a total preparation time for a recipe, a percentage of a total number of key ingredients of the recipe that are present in the shopping list, popularity of the recipe, simplicity of a recipe, a number of times the user previously selected the recipe, some other criterion that may be used to rank a recipe, or some combination thereof.

For example, a ranking criterion may be availability of key ingredients of the recipe from the storefront for purchase that are not present in the shopping list. And the recipe recommendation module 216 may, for each recipe of the one or more recipes, determine for that recipe availability of any key ingredients from the storefront for purchase that are not present in the shopping list. Using this ranking criterion alone results in recipes of the one or more recipes with key ingredients that are not in the shopping list but are available for purchase being ranked higher than recipes with key ingredients that are not available for purchase. In another example, a ranking criterion may be total preparation time.

And the recipe recommendation module 216 may, for each recipe of the one or more recipes, determine respective total preparation times. The recommendation module 216 may then rank the one or more recipes from shortest total preparation time to longest total preparation time. In embodiments, where there are multiple ranking criteria, the recommendation module 216 may weight each of the ranking criteria, and then rank the one or more rankings based on the weighted rankings. In some embodiments, the weights are equal for different ranking criteria. In other embodiments, at least one ranking criterion is weighted differently from another ranking criterion. The recipe recommendation module 216 may provide the one or more ranked recipes to the user client device 105. As shown in and described below with regard to, e.g., FIGS. 4A and 4C, the user client device 105 may present the one or more ranked recipes in ranked order. For example, the user client device may present the one or more ranked recipes on a recipe carousel. In some embodiments, the recipe carousel may be presented on a same page as the item area.

The order management module 220 manages orders for items from users. The order management module 220 receives orders from a user client device 105 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 105 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of their order. In some embodiments, the order management module 220 computes an estimated time of arrival for the picker at the delivery location and provides the estimated time of arrival to the user.

In some embodiments, the order management module 220 facilitates communication between the user client device 105 and the picker client device 110. As noted above, a user may use a user client device 105 to send a message to the picker client device 110. The order management module 220 receives the message from the user client device 105 and transmits the message to the picker client device 110 for presentation to the picker. The picker may use the picker client device 110 to send a message to the user client device 105 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include user data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores a recipe database 245, a user data, item data, order data, and picker data for use by the online concierge system 140. Each recipe in the recipe database 245 includes a full listing of ingredients for the recipe and instructions on how to use ingredients in the full list of ingredients to prepare the meal. In some embodiments, a recipe may include, e.g., a name of the recipe, a total preparation time for the recipe, user reviews of the recipe, pictures of ingredient preparation at one or more steps in the recipe, an active time for the recipe, a number of services associated with the recipe, calories associated with the recipe, some other information relevant to the recipe, or some combination thereof. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
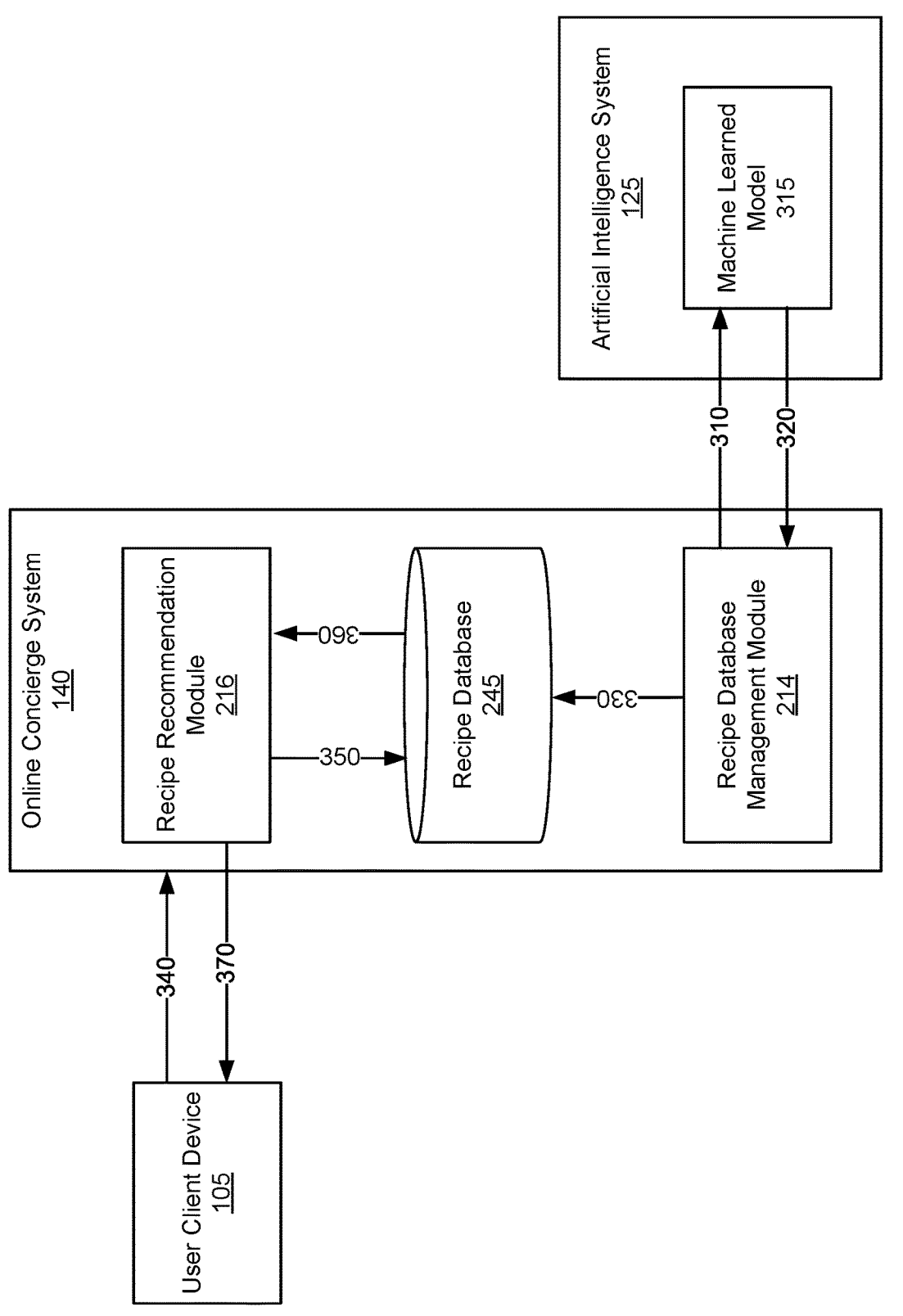
FIG. 3 is a diagram describing generation of recipe recommendations based on shopping list contents and key ingredient mappings derived using the artificial intelligence system, in accordance with one or more embodiments.

FIG. 3 is a diagram describing generation of recipe recommendations based on shopping list contents and key ingredient mappings derived using the AI system 125, in accordance with one or more embodiments. Alternative embodiments may include more, fewer, or different steps from those illustrated in FIG. 3, and the steps may be performed in a different order from that illustrated in FIG. 3. These steps may be performed using components of the system environment. Additionally, each of these steps may be performed automatically by components of the system environment without human intervention. In some embodiments, the diagram may be separated into two independent processes, a database update process, and a recipe recommendation process.

The database update process occurs at steps 310, 320, and 330, and describes one or more embodiments of how the recipe database management module 214 manages the recipes in the recipe database 245 and tags key ingredients in those recipes. The recipe database management module 214 may select a plurality of recipes. The recipe database management module 214 may generate a prompt to provide to a machine learned model. The prompt instructs the machine learned model to identify, for each of the plurality of recipes, at least one key ingredient of that recipe. The recipe database management module 214 provides 310 the prompt to the AI system 125. The AI system 125 applies the prompt to a machine learned model 315 to determine key ingredients for each of the plurality of recipes. The AI system 125 provides 320 the key ingredients for each of the recipes to the recipe database management module 214. Note while the machine learned model 315 is shown as part of the AI system 125, in other embodiments, the machine learned model 315 is part of the online concierge system 140. The recipe database management module 214 updates 330 the recipe database 245 by tagging the ingredients in each recipe that have been identified as key ingredients by the AI system 125.

The recipe recommendation process occurs at steps 340, 350, 360, and 370, and describes how the system environment generates recipe recommendations based on shopping list contents of a user of the user client device 105. The user client device 105 presents an ordering interface for a storefront that includes an item area listing a plurality of food items for sale. Responsive to a request from a user of the user client device 105, the user client device 105 may request 340 the online concierge system 140 update a shopping list (e.g., add a food item to the shopping list, remove a food item from the shopping list, etc.) associated with the user. Responsive to the request, the online concierge system 140 may update the shopping list (e.g., add a food item to the shopping list).

The recipe recommendation module 216 queries 350 the recipe database 245 based in part on the food items in the shopping list to obtain one or more recipes that use at least some of the food items as key ingredients. For example, the recipe recommendation module 216 may identify all food items in the shopping list and then generate the query based on the identified food items.

In some embodiments, a mapping is needed to associate items from the user's shopping list to recipe ingredients. This is because a recipe generally identifies ingredients at a higher level of generality than a user's shopping list. Specifically, the items in the user's shopping list are specific items for sale at a store (e.g., a specific brand and type of milk). In contrast, a recipe lists ingredients as a type of item, without specifying a specific product for sale (e.g., just "milk"). Accordingly, one or more embodiments of the system map each item in a shopping list to a more generic category of the item, which can then be compared to ingredients in a recipe. This may be accomplished, for example, using a hierarchical taxonomy of products, where lower nodes in the taxonomy represent specific products for sale (and which therefore may be in the user's shopping list) and higher-level nodes in the taxonomy represent item types (and which therefore may be an ingredient in a recipe). In this way, the system may convert items in a user's shopping list to item types for comparison with recipe ingredients.

In response to the query 350, the recipe database 245 returns 360 one or more recipes for which one or more key ingredients of the recipe matches one or the identified food items from the query. The system may also determine, for each recipe, how many of the key ingredients are in the user's shopping list. The list of returned recipes comprises a set of candidate recipes that may be recommended to the user based on the contents of the user's shopping list.

The recipe recommendation module 216 ranks the candidate recipes obtained from the recipe database 245 based on one or more ranking criteria (e.g., a number of key ingredients of the recipe that are present in the shopping list). In one or more embodiments, a model is trained to predict an engagement score (e.g., a likelihood that, if presented with a recipe, the user will select the recipe to purchase the remaining items from the recipe), which is then used to rank and select the candidate recipes. The recipe recommendation module 216 then provides 370 the one or more ranked recipes the user client device 105. The user client device 105 may present the one or more ranked recipes in ranked order on a recipe carousel.

In the above manner, the online concierge system 140 can recommend recipes based in part on food items currently in the shopping list. While conventional systems may recommend recipes based on, e.g., overall popularity of a recipe or user preferences. However, these approaches do not consider food items that are in the shopping list of the user. Likewise, while conventional systems may utilize recipe databases to provide recipe suggestions and allow users to manually search for recipes based on specific ingredients and/or browse through categories of recipes, these approaches generally require manual input from the user which can be time-consuming and prone to errors. In contrast, the recipe recommendations are selected and provided by the online concierge system 140.

Figure 4A:
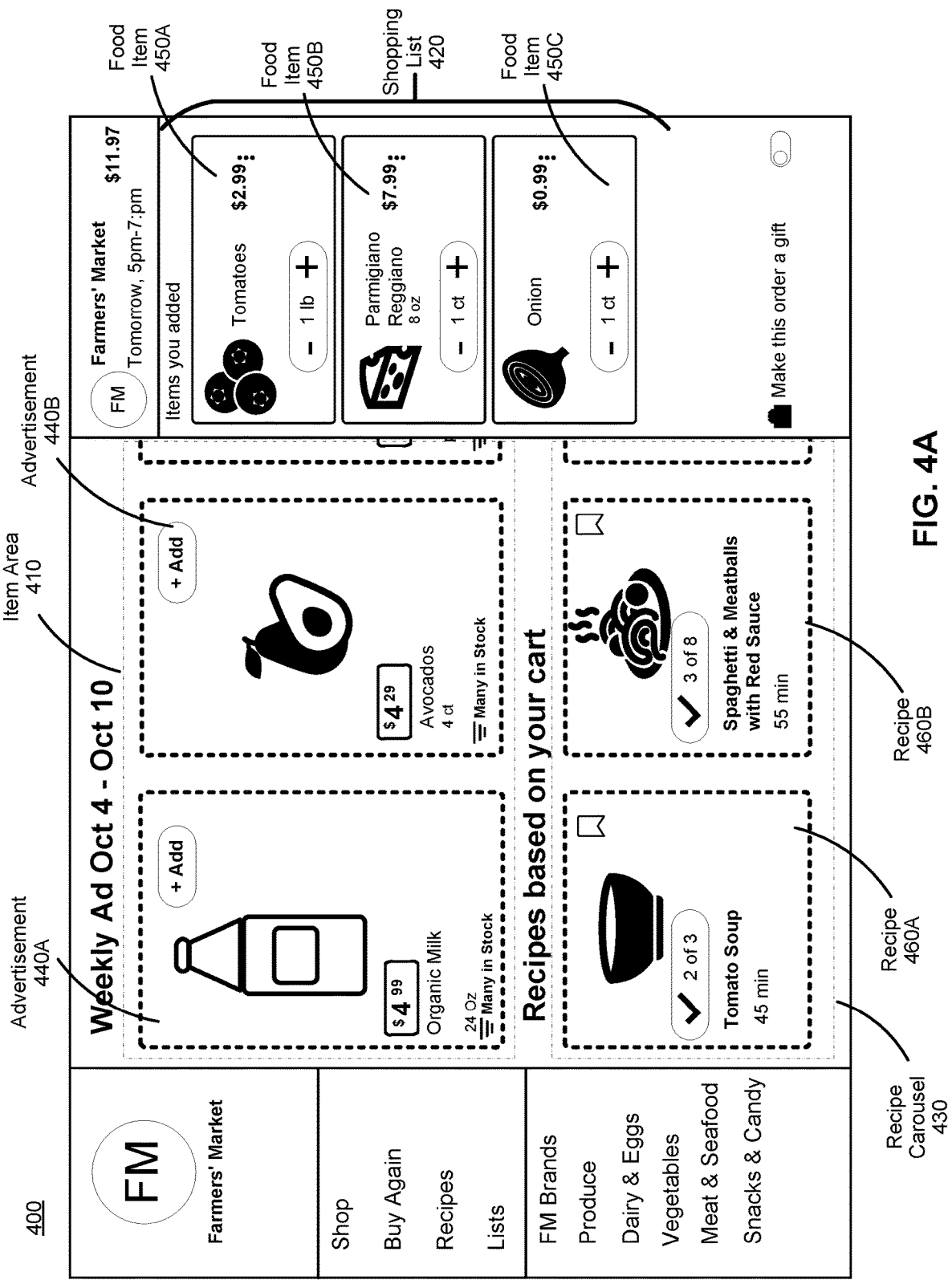
FIG. 4A illustrates an example ordering interface associated with a storefront, in accordance with some embodiments.

FIG. 4A illustrates an example ordering interface 400 associated with a storefront, in accordance with some embodiments. The ordering interface 400 is described above with regard to FIG. 1. The ordering interface 400 may be presented on a user client device (e.g., the user client device 105). The ordering interface 400 is a user interface that presents food items that are available to purchase from the storefront. The storefront is portal used by a retailer (e.g., retailer computing system 120) to sell one or more food items. For example, the retailer in FIG. 4A is "Farmers'

Market." In one or more embodiments, the ordering interface 400 includes at least an item area 410, a shopping list 420, a recipe carousel 430. In other embodiments, the ordering interface 400 includes different or additional elements. In addition, the functions may be distributed among the elements in a different manner than described.

The item area 410 presents information describing various food items that are for sale. For example, as shown the item area 410 presents an advertisement 440A for a food item (e.g., Organic Milk) and an advertisement 440B for another food item (e.g., avocados). The advertisements may be scrolled through allowing a user to view the various food items for sale, add available food items to the shopping list 420, etc. For example, in the example shown in FIG. 4A, there are three food items that have been added to the shopping list, specifically food item 450A (e.g., 1 lb. of tomatoes), food item 450B (8 oz of Parmigiana Reggiano cheese), and food item 450C (an onion).

As described above with regard to, e.g., FIGS. 1-3, the online concierge system 140 provides one or more recipes to the user client device 105 for presentation based in part on the content (i.e., the food items 450A, 450B, 450C) of the shopping list 420 being key ingredients for the one or more recipes. In one or more embodiments, the ordering interface 400 presents the one or more recipes using the recipe carousel 430. For example, as shown the recipe carousel 430 presents a recipe 460A for tomato soup, and a recipe 460B for spaghetti and meatballs with red sauce. The one or more recipes may be scrolled through allowing a user to view the various recipes in the recipe carousel 430. The one or more recipes are presented in ranked order. In the illustrated embodiments the recipe 460A has the highest rank, followed by the recipe 460B, and so on and so forth. In some embodiments, each of the displayed recipes includes an indication of how many key ingredients (for a given recipe) are currently present in the shopping list 420. For example, the recipe 460A is for tomato soup, and the recipe has three key ingredients, tomatoes, onions, and vegetable stock. And as two of the key ingredients (i.e., tomatoes and an onion) of the recipe are in the shopping list, the recipe shows that "2 of 3" key ingredients are present. The displayed recipes may be bookmarkable.

Figure 4B:
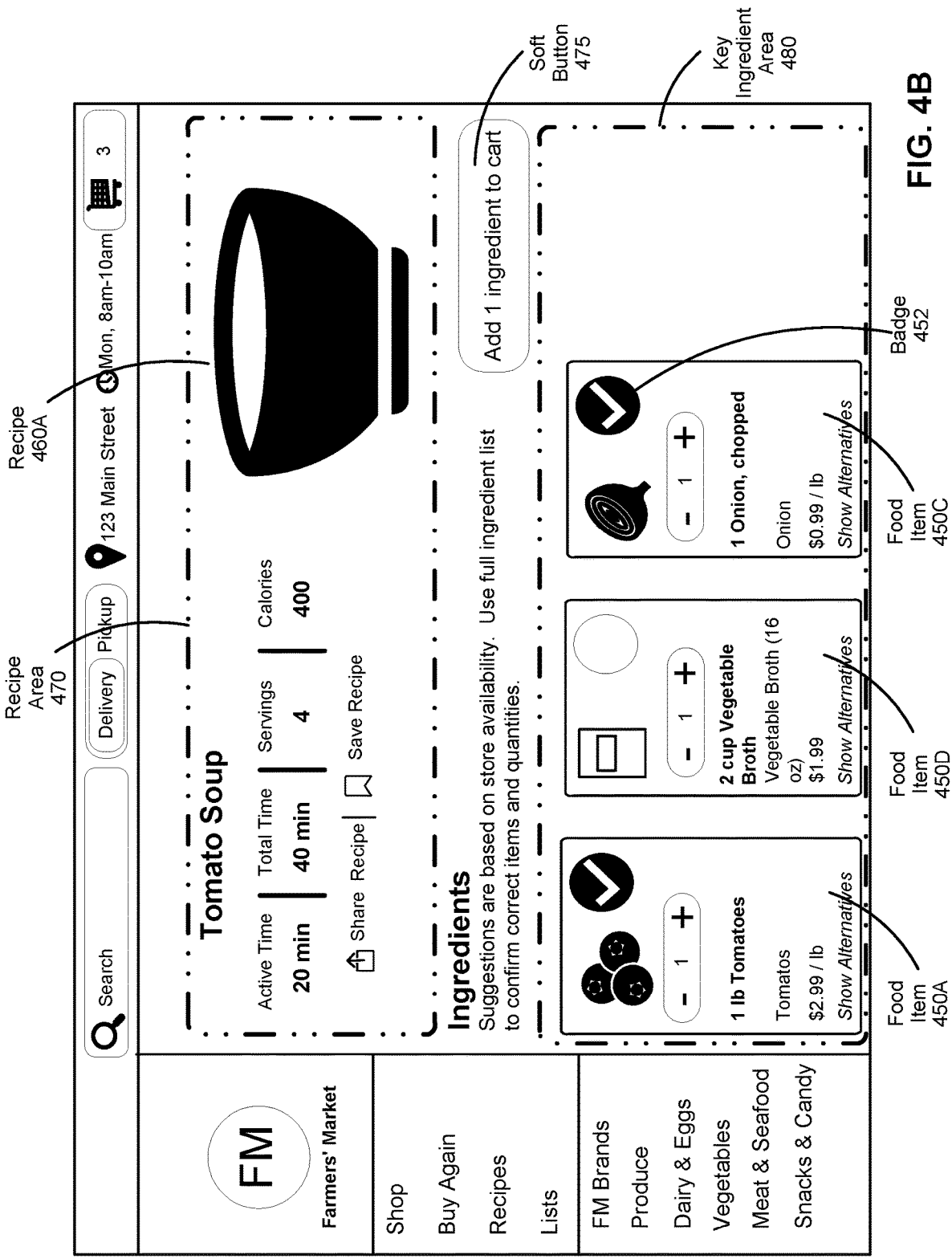
FIG. 4B illustrates the ordering interface of FIG. 4A after selection of a recipe, in accordance with some embodiments.

Moreover, responsive to a selection of a particular recipe, the ordering interface 400 may update to show further details about the selected recipe. For example, FIG. 4B illustrates the ordering interface 400 of FIG. 4A after selection of the recipe 460A, in accordance with some embodiments. In some embodiments, once a recipe has been selected, the ordering interface 400 is updated to prominently present information associated with the selected recipe in a recipe area 470 and key ingredients for the selected recipe in a key ingredient area 480.

The recipe area 470 presents information describing the selected recipe. The presented information may include information about the selected recipe. The information may include, e.g., a name of the recipe, a full listing of ingredients for the recipe, instructions on how to use ingredients in the full list of ingredients to prepare the meal, an active time for the recipe, a total preparation time for the recipe (also referred to as total time), number of services the recipe produces, calories associated with the recipe, user reviews of the recipe, pictures of ingredient preparation at one or more steps in the recipe, some other information relevant to the recipe, or some combination thereof. For example, in FIG. 4B the recipe area 470 presents information associated with the selected recipe (i.e., the recipe 460A) for tomato soup.

The key ingredient area 480 presents all of the food items that are key ingredients associated with the recipe presented in the recipe area 470. Note that the shopping list may include food items (e.g., the food item 450B) that are not key ingredients for the selected recipe and hence are not presented in the key ingredient area 480 for that recipe. The presented food items may also include an amount of the food item suggested for the selected recipe. For example, in one or more embodiments, the key ingredient area 480 presents the food item 450A, the food item 450C, and a food item 450D, all of which are key ingredients to the recipe 460A. For food items in the key ingredient area 480, each food item is presented with an indication of whether or not the food item is already present in the shopping list. For example, a food item in the key ingredient area 480 that is already present in the shopping list may include a badge (e.g., badge 452), and food items (e.g., the food item 450D) that are not currently in the shopping list would be missing the badge. The badge may be, e.g., a large check mark. In other embodiments, some other type of badge and/or means of notification may be used as an indication that a food item is already present in the shopping list.

In some embodiments, the ordering interface 400 may also include a soft button 475 to add any food items in the key ingredient area 480 that are not already in the shopping list to the shopping list with a single selection. The soft button 475 may also include text specifying the number of ingredients that would be added to the shopping list upon selection of soft button 475. For example, as shown, only the food item 450D is not already part of the shopping list, accordingly, the displayed text is "Add 1 ingredient to cart." Note, in some embodiments, the ordering interface 400 may also present a price associated with selection of the soft button 475.

Figure 4C:
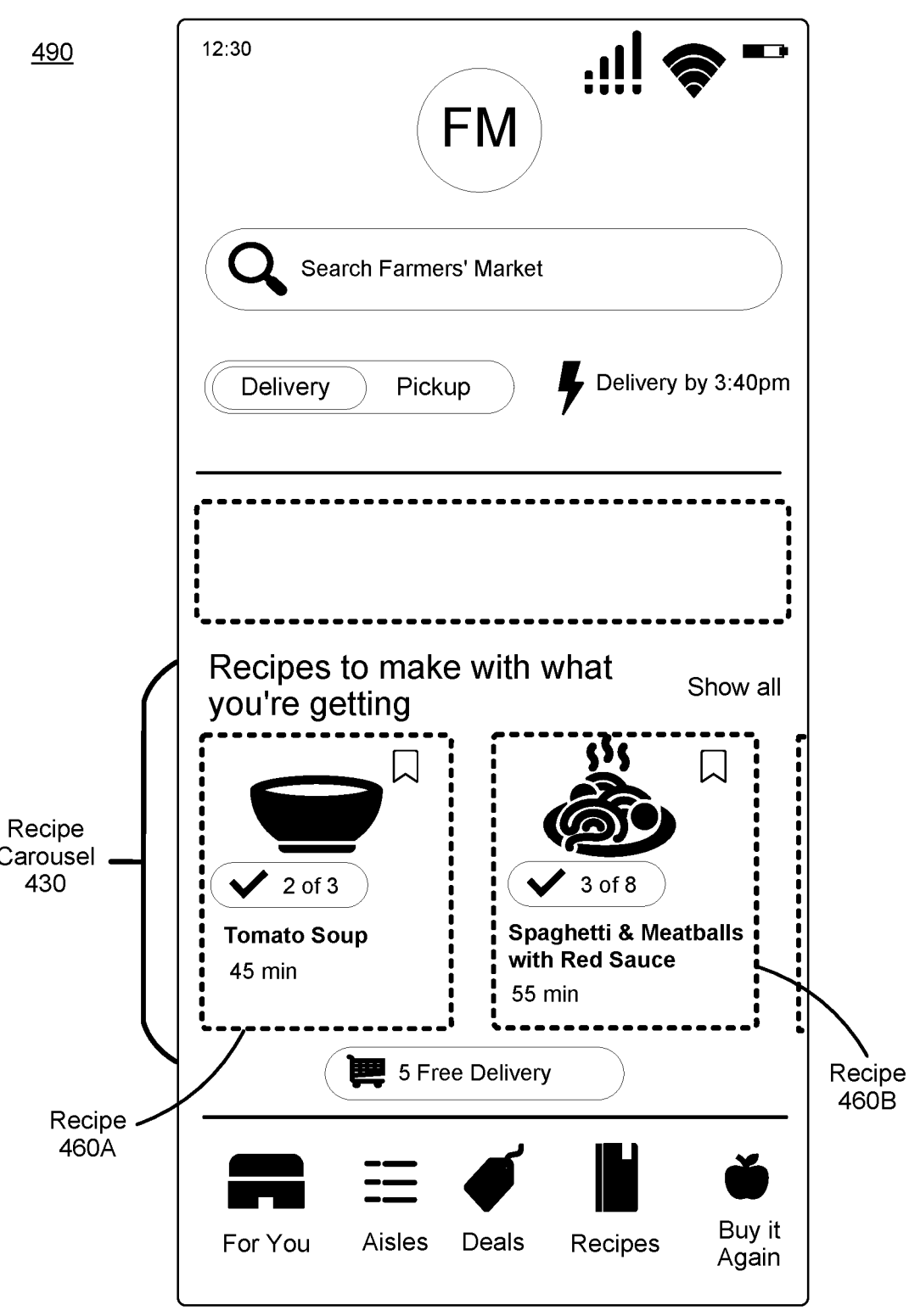
FIG. 4C illustrates another example of an ordering interface associated with a storefront in a mobile configuration, in accordance with some embodiments.

FIG. 4C illustrates another example of an ordering interface 490 associated with a storefront in a mobile configuration, in accordance with some embodiments. The mobile configuration is a configuration of the ordering interface 490 that is optimized for presentation on mobile devices (e.g., smart phones). The ordering interface 490 is substantially the same as the ordering interface 400 described above in the context of FIGS. 4A and 4B, just optimized for presentation on mobile devices. As such the ordering interface 490 may have the same functionality as the ordering interface 400. For example, as shown in FIG. 4C, the ordering interface 490 includes the recipe carousel 430 showing recipes (e.g., the recipe 460A and the recipe 460B) received from the online concierge system 140 (e.g., based in part on the food items in the shopping list being key ingredients for the one or more recipes).

Figure 5:
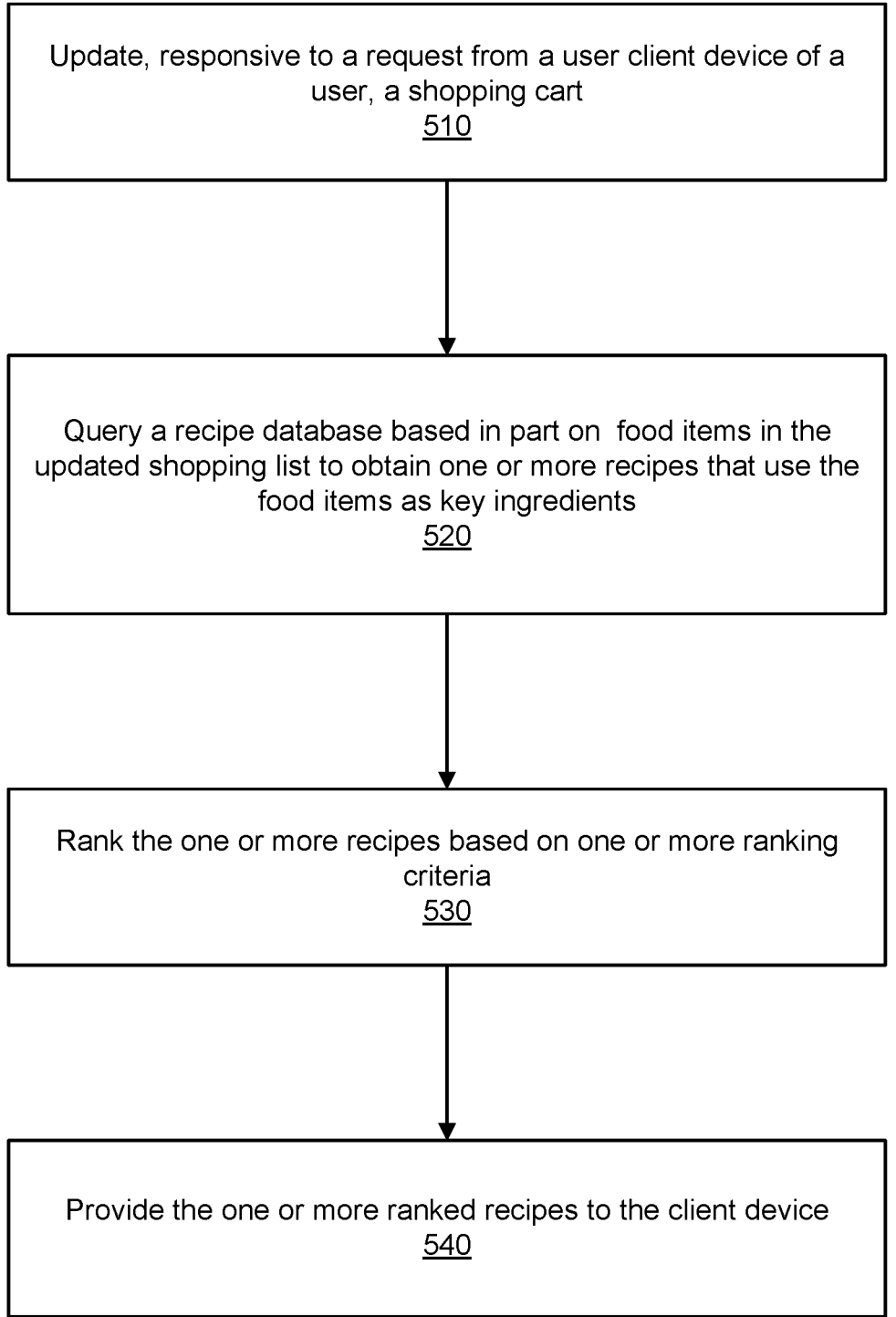
FIG. 5 is a flowchart for a method of recommending recipes based on shopping list contents and key ingredient mappings derived using artificial intelligence, in accordance with some embodiments.

FIG. 5 is a flowchart for a method of recommending recipes based on shopping list contents and key ingredient mappings derived using AI, in accordance with some embodiments. Alternative embodiments may include more, fewer, or different steps from those illustrated in FIG. 5, and the steps may be performed in a different order from that illustrated in FIG. 5. These steps may be performed by an online concierge system (e.g., online concierge system 140). Additionally, each of these steps may be performed automatically by the online concierge system without human intervention.

The user client device (e.g., the user client device 105) presents a storefront that includes an item area listing one or more food items for sale. A user of the user client device may request, via the client device, that a food item be added to a shopping list or removed from the shopping list.

The online concierge system updates 510, responsive to a request from a user client device of a user, a shopping list. For example, if the request were to add a food item to the shopping list, the online concierge system may update the shopping list by adding the requested food item.

The online concierge system queries 520 a recipe database (e.g., the recipe database 245) based in part on food items in the updated shopping list to obtain one or more recipes that use the food items as key ingredients. For example, a recipe recommendation module (e.g., the recipe recommendation module 216) may generate a query for recipes using item data (e.g., SKU, item identifier, etc.) associated with food items in the shopping list as parameters for the query. The recipe recommendation module may provide the query to the recipe database 245 to obtain one or more recipes that use at least one food item in the shopping list as a key ingredient.

The online concierge system ranks 530 the one or more recipes based on one or more ranking criteria. In some embodiments, the one or more ranking criteria include a ranking criterion that ranks a recipe based on a number of key ingredients of the recipe that are present in the shopping list. For example, a recipe that has a larger number of key ingredients in the shopping list may be ranked higher than a recipe with a smaller number of key ingredients in the shopping list.

The online concierge system provides 540 the one or more ranked recipes to the user client device. The user client device may present the one or more ranked recipes in ranked order via an ordering interface. In some embodiments, the one or more recipes are presented using a recipe carousel of the ordering interface.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

maintaining a recipe database that stores a plurality of recipes, wherein each recipe includes a list of ingredients;

for each of at least a subset of the recipes in the recipe database, tagging one or more ingredients in the recipe as key ingredients, wherein the tagging comprises using a trained model that is configured to identify key ingredients in a recipe based on characteristics about the recipe, wherein the trained model is trained as a large language model (LLM) by:

obtaining a pre-trained LLM having a generative pre-training architecture, generating training examples from a plurality of training recipes, each associated with a list of one or more key ingredients, and tuning the pre-trained LLM with the training examples to identify key ingredients from recipes based on the characteristics of the recipes;

receiving, from a first user client device of a first user, a first request to add a food item to a shopping list, wherein the first user client device presents a storefront that includes a plurality of items including the food item for sale;

responsive to the first request, updating the shopping list to include the food item;

querying the recipe database based in part on the food item to obtain one or more candidate recipes that include the food item as a tagged key ingredient;

ranking the candidate recipes based on one or more ranking criteria;

selecting one or more of the candidate recipes based on the ranking;

providing the selected recipes to the first user client device, wherein the user client device displays the selected recipes;

receiving, from the first user client device, a second request to order the shopping list;

transmitting the order to a second user client device of a second user to fulfill the order requested by the first user; and displaying the shopping list on an interface of the second user client device, wherein the second user fulfills the order following the display of the shopping list on the interface of the second user client device.

2. The method of claim 1, wherein tagging one or more ingredients in a recipe as key ingredients comprises:

generating a prompt to provide to the trained model, the prompt instructing the trained model identify at least one key ingredient from the list of ingredients of the recipe;

providing the prompt to the trained model to obtain at least one key ingredient for the recipe; and updating the recipe database with a tag identifying each of the at least one key ingredients in the recipe as a key ingredient.

3. The method of claim 2, wherein the trained model comprises a large language model (LLM) having a generative pre-training architecture.

4. The method of claim 2, wherein querying the recipe database based in part on the food item to obtain one or more candidate recipes that include the food item as a tagged key ingredient comprises:

identifying an item type corresponding to the food item, wherein the food item is an instance of the item type;

identifying one or more recipes in the recipe database that are responsive to the querying, wherein a recipe is responsive to the querying if the item type matches an ingredient contained in the recipe that is tagged as a key ingredient; and returning the identified recipes as candidate recipes.

5. The method of claim 1, wherein ranking the candidate recipes comprises ranking the candidate recipes based on a number of key ingredients in a recipe that match items in the shopping list.

6. The method of claim 1, wherein ranking the candidate recipes comprises ranking the candidate recipes based on an availability of key ingredients of the recipe from the storefront for purchase that are not present in the shopping list.

7. The method of claim 1, further comprising:

receiving a selection of one of the recipes provided to the user client device; and responsive to receiving the selection, adding to the shopping list all ingredients of the selected recipe that are not already in the shopping list.

8. A computer program product comprising a non-transitory computer readable storage medium having instructions encoded thereon that, when executed by a processor of a computer system, cause the processor to perform steps comprising:

maintaining a recipe database that stores a plurality of recipes, wherein each recipe includes a list of ingredients;

for each of at least a subset of the recipes in the recipe database, tagging one or more ingredients in the recipe as key ingredients, wherein the tagging comprises using a trained model that is configured to identify key ingredients in a recipe based on characteristics about the recipe, wherein the trained model is trained as a large language model (LLM) by:

obtaining a pre-trained LLM having a generative pre-training architecture, generating training examples from a plurality of training recipes, each associated with a list of one or more key ingredients, and tuning the pre-trained LLM with the training examples to identify key ingredients from recipes based on the characteristics of the recipes;

receiving, from a user client device of a first user, a first request to add a food item to a shopping list, wherein the first user client device presents a storefront that includes a plurality of items including the food item for sale;

responsive to the first request, updating the shopping list to include the food item;

querying the recipe database based in part on the food item to obtain one or more candidate recipes that include the food item as a tagged key ingredient;

ranking the candidate recipes based on one or more ranking criteria;

selecting one or more of the candidate recipes based on the ranking; and providing the selected recipes to the user client device, wherein the user client device displays the selected recipes;

receiving, from the first user client device, a second request to order the shopping list;

transmitting the order to a second user client device of a second user to fulfill the order requested by the first user; and displaying the shopping list on an interface of the second user client device, wherein the second user fulfills the order following the display of the shopping list on the interface of the second user client device.

9. The computer program product of claim 8, wherein tagging one or more ingredients in a recipe as key ingredients comprises:

generating a prompt to provide to the trained model, the prompt instructing the trained model identify at least one key ingredient from the list of ingredients of the recipe;

providing the prompt to the trained model to obtain at least one key ingredient for the recipe; and updating the recipe database with a tag identifying each of the at least one key ingredients in the recipe as a key ingredient.

10. The computer program product of claim 9, wherein the trained model comprises a large language model (LLM) having a generative pre-training architecture.

11. The computer program product of claim 9, wherein querying the recipe database based in part on the food item to obtain one or more candidate recipes that include the food item as a tagged key ingredient comprises:

identifying an item type corresponding to the food item, wherein the food item is an instance of the item type;

identifying one or more recipes in the recipe database that are responsive to the querying, wherein a recipe is responsive to the querying if the item type matches an ingredient contained in the recipe that is tagged as a key ingredient; and returning the identified recipes as candidate recipes.

12. The computer program product of claim 8, wherein ranking the candidate recipes comprises ranking the candidate recipes based on a number of key ingredients in a recipe that match items in the shopping list.

13. The computer program product of claim 8, wherein ranking the candidate recipes comprises ranking the candidate recipes based on an availability of key ingredients of the recipe from the storefront for purchase that are not present in the shopping list.

14. The computer program product of claim 8, wherein the non-transitory computer readable storage medium further has instructions encoded thereon that, when executed by a processor of a computer system, cause the processor to perform steps comprising:

receiving a selection of one of the recipes provided to the user client device; and responsive to receiving the selection, adding to the shopping list all ingredients of the selected recipe that are not already in the shopping list.

15. A computer system comprising:

one or more processors; and a non-transitory computer readable storage medium having instructions encoded thereon that, when executed by the processor, cause the processor to perform steps comprising:

maintaining a recipe database that stores a plurality of recipes, wherein each recipe includes a list of ingredients;

for each of at least a subset of the recipes in the recipe database, tagging one or more ingredients in the recipe as key ingredients, wherein the tagging comprises using a trained model that is configured to identify key ingredients in a recipe based on characteristics about the recipe, wherein the trained model is trained as a large language model (LLM) by:

obtaining a pre-trained LLM having a generative pre-training architecture, generating training examples from a plurality of training recipes, each associated with a list of one or more key ingredients, and tuning the pre-trained LLM with the training examples to identify key ingredients from recipes based on the characteristics of the recipes;

receiving, from a user client device of a first user, a first request to add a food item to a shopping list, wherein the first user client device presents a storefront that includes a plurality of items including the food item for sale;

responsive to the first request, updating the shopping list to include the food item;

querying the recipe database based in part on the food item to obtain one or more candidate recipes that include the food item as a tagged key ingredient;

ranking the candidate recipes based on one or more ranking criteria;

selecting one or more of the candidate recipes based on the ranking; and providing the selected recipes to the user client device, wherein the user client device displays the selected recipes;

receiving, from the first user client device, a second request to order the shopping list;

transmitting the order to a second user client device of a second user to fulfill the order requested by the first user; and displaying the shopping list on an interface of the second user client device, wherein the second user fulfills the order following the display of the shopping list on the interface of the second user client device.

16. The computer system of claim 15, wherein tagging one or more ingredients in a recipe as key ingredients comprises:

generating a prompt to provide to the trained model, the prompt instructing the trained model identify at least one key ingredient from the list of ingredients of the recipe;

providing the prompt to the trained model to obtain at least one key ingredient for the recipe; and updating the recipe database with a tag identifying each of the at least one key ingredients in the recipe as a key ingredient.

17. The computer system of claim 16, wherein the trained model comprises a large language model (LLM) having a generative pre-training architecture.

18. The computer system of claim 16, wherein querying the recipe database based in part on the food item to obtain one or more candidate recipes that include the food item as a tagged key ingredient comprises:

identifying an item type corresponding to the food item, wherein the food item is an instance of the item type;

identifying one or more recipes in the recipe database that are responsive to the querying, wherein a recipe is responsive to the querying if the item type matches an ingredient contained in the recipe that is tagged as a key ingredient; and returning the identified recipes as candidate recipes.

19. The computer system of claim 15, wherein ranking the candidate recipes comprises ranking the candidate recipes based on a number of key ingredients in a recipe that match items in the shopping list.

20. The computer system of claim 15, wherein ranking the candidate recipes comprises ranking the candidate recipes based on an availability of key ingredients of the recipe from the storefront for purchase that are not present in the shopping list.

* * * * *